Feb. 28, 1967   L. G. KILMER   3,305,929
DIP MEASURING INSTRUMENT
Filed May 8, 1964   2 Sheets-Sheet 1
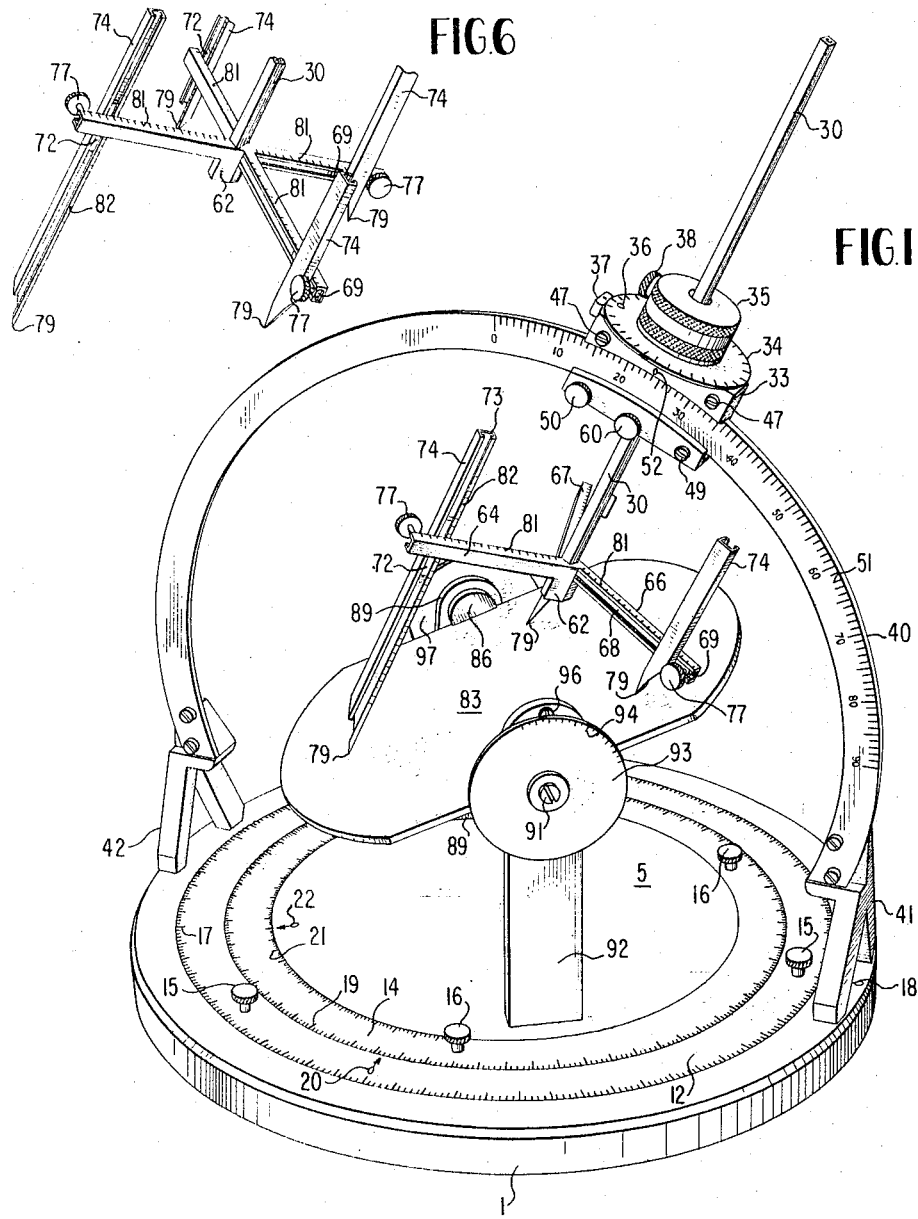
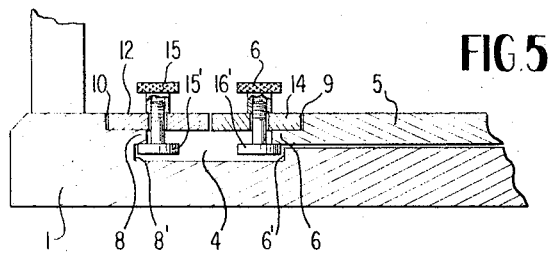
INVENTOR.
LAUREN G. KILMER
BY
McLean and Diddle
ATTORNEY Feb. 28, 1967  L. G. KILMER  3,305,929
DIP MEASURING INSTRUMENT
Filed May 8, 1964  2 Sheets-Sheet 2
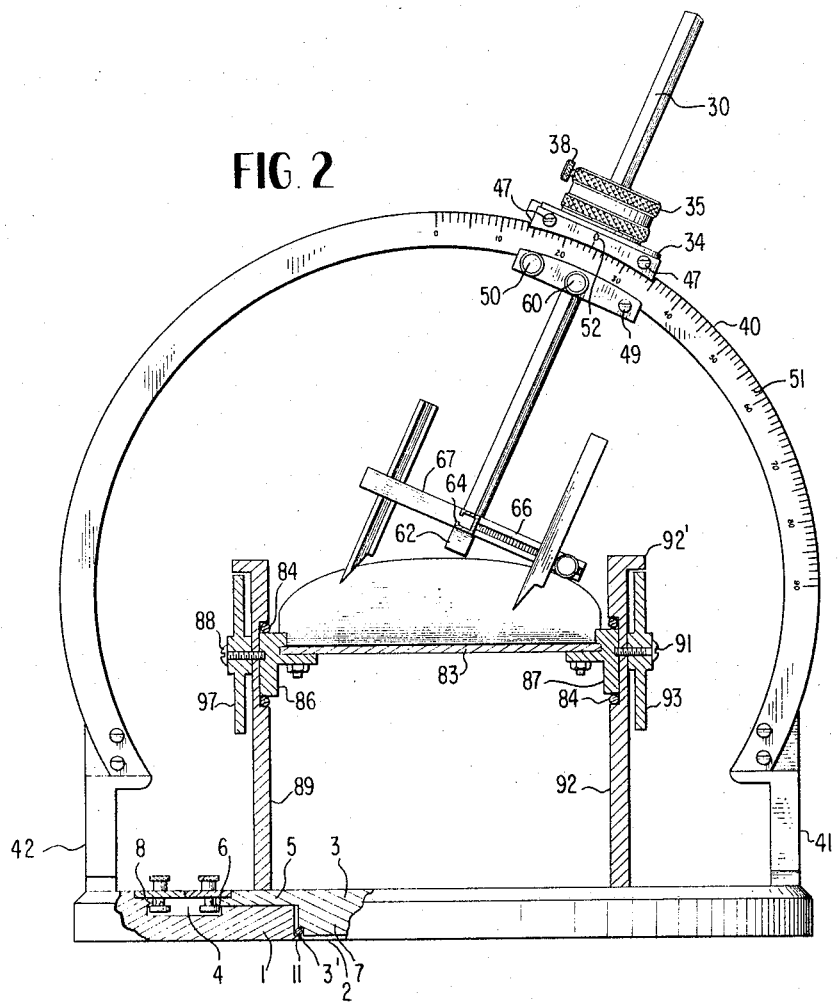
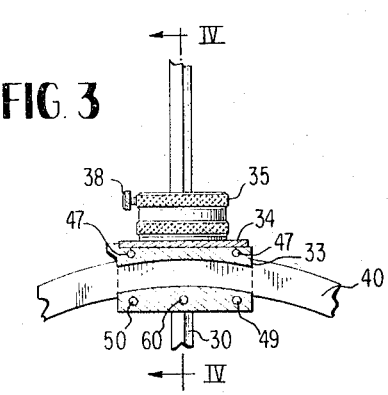
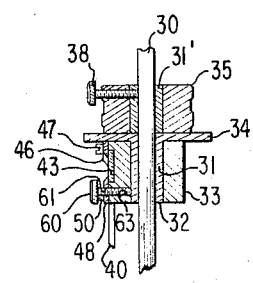
INVENTOR.
LAUREN G. KILMER
BY
ATTORNEY

United States Patent Office 3,305,929
Patented Feb. 28, 1967

3,305,929
DIP MEASURING INSTRUMENT
Lauren G. Kilmer, Tulsa, Okla., assignor to Sinclair Research, Inc., New York, N.Y., a corporation of Delaware
Filed May 8, 1964, Ser. No. 365,875
11 Claims. (Cl. 33—1)

The present invention relates to measuring instruments and more particularly to a measuring instrument for computing the true dip and true direction of dip of various strata traversed by a logging tool and to provide a physical analog of the precise conditions existing in the well relative to a stratum, the well and the well tool.

In the field of surveying for new sources of crude oil many tests have been devised for determining the nature and disposition of the subsurface formations, since the composition and structure of these formations are often indicative of the presence of oil in the region under investigation. One of the tests thus devised relates to the determination of the nature of the specific strata and of particular interest to the present invention, a determination of the amount and direction of dip of various strata encountered. The dip of a stratum is defined as the angle with respect to the horizontal at which a stratum intersects a well bore and the direction of the dip is the angle relative to north of the most steeply dipping line which may be drawn in the plane of the stratum.

It has been found that the composition of the rocks forming the various subsurface strata have different electrical resistances to the drilling operation. Since a plane in space is determined by any three, or more, points in that plane, it is possible to define completely the plane of the upper limits or alternatively of the lower limits of a stratum by measuring the vertical depth of the beginning of the stratum at spaced locations about the well bore. In order to obtain such indications, a well tool is withdrawn through the well. The well tool commonly is provided with three outwardly extending arms each containing a pair of electrodes which contact the wall of the well. The displacement of the electrodes relative to the center of the tool as well as the resistance through the electrodes are measured and recorded against tool depth on a well log.

The well log, therefore, provides a complete profile of the well bore at several and preferably three spaced locations thereabout. The dip of the plane relative to the well is obtainable from the above information, since pronounced changes in measured resistivity are encountered at boundaries between strata, but in order to obtain dip relative to the horizontal and the direction of dip relative to a reference, i.e. magnetic north, the angle of the tool from vertical, the azimuth of the tool with respect to the reference, and the azimuth of the inclination of the well from the vertical must be obtained. Information regarding the direction of these elements in space relative to the reference, i.e. magnetic north, may be obtained from a compass which is positioned within the well tool and is suspended in gimbals so that it always remains in a horizontal position. The direction toward which the north-seeking end of the compass points is measured with respect to a reference line of the well tool so that all compass readings may be readily interpreted. Very often this reference is taken to be one of the electrode arms, e.g. the No. 1 arm, which are employed to measure the diameter of the well. Since the well tool is aligned with the well, the angle of well deviation is measured by measuring the angle between the direction of the tool axis and vertical as indicated by a plumb line or pendulum mechanism.

From the above information, that is, the direction and depth of the three measured points of apparent change in resistivity between strata and the direction and angular position of the well, it is possible to determine completely the position of the interfacial surfaces between strata and the well in space and of the relative positions of such surfaces and the well. Specifically, since the angles between the reference line of the tool and magnetic north, for example, the direction and angle of deviation of the well from vertical, and the depths of the calipers are known, the surface of a stratum is completely defined with respect to the well, the vertical and magnetic north.

The dip measuring instrument of the present invention is designed to have read into it the above-discussed data and then to represent the plane of the interface of strata being considered by a flat plate arranged at an angle with respect to the horizontal corresponding to the angle of inclination of the strata and at an angle from a reference corresponding to the deviation of the strata dip direction from north. Generally, the instrument comprises a base member having upstanding arms and a semi-circular track supported on the upstanding arms and a semi-circular track supported on the upstanding arms. A carriage is mounted on the semi-circular track such that the carriage is slidable arcuately therealong. A shaft adapted for rotation about its own longitudinal axis is inserted through the carriage, as it is moved along the track, which retains the shaft with its axis in a plane parallel to that of the track. A spider or fingered carrier is disposed about the shaft and is rotatable therewith and also with respect to the carriage. The carrier includes three outwardly extending arms representnig the electrodes of the logging tool in the well which are arranged perpendicular to the shaft. Each of the arms carries a downwardly depending arm perpendicular thereto and parallel to the shaft. The downwardly depending arms are parallel to each other and each depending arm is pointed at its lower end. Each of the downwardly depending arms is adjustable both longitudinally and perpendicularly with respect to the outwardly extending arm to which it is adjustably secured. Disposed below the arms is the flat plate representing the plane of the geological surface under consideration. This plate is supported by two upstanding members which extend upwardly from a platform mounted on the base member for rotation thereon about a vertical axis. The plate is further supported by such upstanding members for rotation about a horizontal axis parallel to the plane of the upper surface thereof.

In order to operate the instrument, the slidable carriage is moved along the semi-circular track in a direction and by an amount equal to the angle of inclination of the well from the vertical. The track is preferably positioned in a vertical plane and is suitably calibrated to facilitate fixing the carriage at the appropriate angle from the vertical. The relative positions of the carriage and track and hence of the axis of the shaft are thereupon fixed. The position of each of the downwardly depending arms is then adjusted both radially and lengthwise of the axis of the shaft, each by an amount such that its tip corresponds on the scale of the instrument and relative to the axis of the shaft to the position of an electrode of the well logging tool relative to the longitudinal center line of the well at a detected variation in resistivity. The outward extension represents a radius of the well whereas the movement of the pointed arm perpendicular to its supporting arm represents the depth where the electrode detected the variation in resistance under consideration relative to an arbitrary datum position frequently the plane perpendicular to the well bore at the location of the No. 1 electrode. Thereafter, the carrier is rotated relative to the sliding carriage to establish between the computer reference line and the plane of the sliding carriage an angle equal to the angle between the logging tool reference direction and the direction of the angle of inclination of the well from the vertical as determined from the dip log. The relative positions of the pointed lower ends of the three downwardly depending arms in space, as well as relative to the shaft which represents the well, are now identical with the three measured points of the stratum in the well. Further, the shaft and its associated carrier have the same position in space as the well tool and therefore all conditions with respect to these members are the same as with respect to the corresponding members in the well. The plate is now rotated on the base member and the carrier is lowered until all three of the pointed ends of the downwardly depending arms contact the plate. The position of the plate now corresponds to the surface of the stratum investigated. The angle of this plate relative to the horizontal is measured on a scale inscribed on a vertical disc secured directly to one of the pivots of the plate. The direction of the dip of the stratum may be read from a scale inscribed on a horizontal ring relative to the rotating platform carrying the plate.

In the instrument, all scales are preferably placed immediately adjacent their associated indicators so that no parallax occurs in any of the readings. Further, the arms which represent the electrodes of the well log are disposed above the plate and are vertically adjustable so that they may be brought into appropriate engagement therewith.

The size of the instrument, including the arms, may be varied as desired as long as a ratio is maintained between the dimensions and angles measured and those inserted into the instrument. Convenient ratios are from 5:1 to 8:1. The readings obtained from conventional well logging tools may be inserted into the instrument in any order to obtain a complete physical analog of the well, the stratum and the tool within the well to provide a ready visual indication to the investigator of the conditions as they truly existed at the time of measurement. Furthermore, after making the various settings on the instrument, no movement of the settings is required before inspection of the instrument so that the operator may quickly and simply check his settings without having to completely reset the instrument.

It is therefore a primary object of the present invention to provide an improved mechanical analog computer for producing a direct physical analog of the positions in space of the well and stratum under investigation.

It is another object of the present invention to provide a dip measuring instrument for computing the amount and direction of dip of a stratum in wells, even wells having an angle of inclination approaching 90°, which instrument includes a few simple adjustable members whose adjustments do not interact so that the various settings may be put into the instrument in any order as desired and in which the apparatus for inserting related readings are grouped together.

It is still another object of the present invention to provide a dip measuring instrument which is simple and rugged and in which settings may be made rapidly without regard to order of insertion and without regard to data normally not given on dip logs.

It is therefore another object of the present invention to provide a mechanical analog dip computer which may be rapidly set up to effect a reading, since all adjustments are easily inserted and are completely independent of one another and may be applied to the instrument in any desired sequence.

The above and still further objects, features and advantages of the present invention will become apparent upon consideration of the following detailed description of one specific embodiment thereof, especially when taken in conjunction with the accompanying drawings, wherein:

FIGURE 1 is a perspective view of the apparatus of the invention;

FIGURE 2 is a cross-sectional view in elevation of the apparatus shown in FIGURE 1;

FIGURE 3 is a detailed view of the movable carriage which rides on the semi-circular track of the frame as shown in FIGURE 1;

FIGURE 4 is taken along section line IV—IV of FIGURE 3;

FIGURE 5 is a detailed view partly in section of the junction between the base plates as shown in FIGURE 2; and FIGURE 6 is a view of a four-armed spider for use with the device of FIGURE 1.

Referring specifically to FIGURES 1 and 2 of the accompanying drawings, the dip analog computer of the present invention comprises an annular base 1 having a generally rectangular vertical cross-section. The base 1 is provided with a central circular opening 2 (FIGURE 2). A cylindrical member 3 is supported in center hole 2 in the base 1 on ball bearings 3' which rest on lip 11 of the base member 1. The base member 1 is also provided with a circular recess 4 extending around the circular center opening 2. Lip 6 formed on the circular disk or platform 5, which forms a part of the cylindrical member 3 and extends outwardly from the center portion 7 of the member 3, extends outwardly to a point near flange 8 on the base member 1. The upper surface of the cylindrical member 3 is in the same plane as the upper surface of base member 1 except for the marginal area around lip 6 which is depressed to form a recess 9 which is in the same plane as recess 10 formed by flange 8 on the base member 1.

Two annular plates 12 and 14 are supported concentrically, respectively, on flange 8 and lip 6 and adapted to rotate about the axis of the base member 1 with plate 14 slidingly received within plate 12. The plate 12 can be fixed relative to base member 1 by retaining screws 15, and the plate 14 can be fixed relative to the circular member 3 by retaining screws 16. Referring also to FIGURE 5, the heads 15' and 16', respectively, of said retaining screws 15 and 16 have flat sides facing the walls and to keep them from turning when the screws are tightened.

The plate 12 is provided with a scale 17 which is read in conjunction with a pointer 18 incribed on base member 1, as will be indicated subsequently. Plate 14 is provided with two scales 19 and 21 which are read in conjunction with, respectively, a pointer 20 inscribed on plate 12 and a pointer 22 inscribed on the circular member 3.

Referring to FIGURES 3 and 4, the upper end of a rectangular shaft 30 passes through a sleeve 31 which extends through an aperture 32 in adjustable carriage 33. The upper end of the sleeve 31 terminates in a thin circular plate 34 which rests on the top surface of the carriage 33. The shaft 30 extends completely through the sleeve 31 and at its upper end also passes through a sleeve 31' arranged in hand wheel 35. A scale 36 is provided on plate 34 and is adapted to be read by an indicator 37 formed on the carriage 33. Thumb screw 38, which is threaded into the wheel 35 passes through a hole in sleeve 31' and is adapted to secure shaft 30 with respect to the wheel 35 and prevent sliding of the shaft vertically through sleeves 31 and 31'.

The adjustable carriage 33 is adapted to slide along a semi-circular track 40 supported by two legs 41 and 42 which are secured to the base 1 at diametrically opposed points adjacent its outer periphery. The center line through the legs 41 and 42 passes through the axis of the center hole 2 of base member 1. The track 40 is accommodated in an arcuate recess 43 in the front surface of the carriage 33, and the track 40 is offset from the center of the legs 41 and 42 by a distance equal to the distance from the center of the shaft 30 to the track 40 as viewed in FIGURE 4. In this way when the shaft 30 is vertical the axis of the shaft 30 coincides with the axis of center hole 2.

The adjustable carriage 33 is slidably secured to the track 40 by a first plate 46 which abuts the surface of the housing 33 immediately under the plate 34 and is secured thereto by means of suitable bolts 47. The plate 46 overlaps the track 40 but does not exert pressure thereagainst so that it provides merely a guiding function. A second plate 48 is secured to the surface of the block 33 immediately below the recess 43 by means of a bolt 49 and a thumb screw 50. The plate 48 is spaced slightly from the adjacent surface of the movable carriage 33 so that by tightening or loosening the thumb screw 50, the plate 48 may be brought into or released from frictional engagement with the adjacent surface of the track 40 so as to either lock the carriage 33 into place or to release it for movement along the track 40, this movement being indicated by the position of a scale 57 on track 40 relative to an indicator 52 formed on plate 46 at the center of the carriage 33. It is apparent that in order for the carriage 33 to be movable along the semi-circular track 40 that the center of rotation of the shaft 30 must lie at the center of curvature of the track 40 as indicated in the drawings. The plane of this rotation includes pointer 18 as an indicator of the direction of track 40.

As previously indicated, the sleeve 31 which is rotatable about the shaft 30 is also rotatable with respect to the movable carriage 33 and in order to lock the sleeve 31 in place with respect to the carriage 33 there is provided a thumb screw 60 which passes through an enlarged aperture 61 in the plate 48 and is disposed in threaded engagement with an aperture 63 in the carriage 33. The aperture 63 communicates with the outer surface of the sleeve 31 so that when it is wished to lock the sleeve 31 in place with respect to the carriage 33 it is merely necessary to turn the thumb screw 60 until the screw engages the sleeve 31.

Relative angular rotation between the shaft 30 and the sleeve 31 and sleeve 31' is prevented due to the rectangular shape of the mating surfaces of the shaft and sleeves. The vertical position of the shaft 30 is fixed by thumb screw 38 threaded in wheel 35 as discussed above.

Three arms 64, 66 and 67 are secured to the arm holder or support 62 and extend outwardly therefrom. These arms are displaced 120° relative to one another and are perpendicular to shaft 30. FIGURE 6 illustrates four arms displaced 90°. Arm support 62 is secured to the shaft 30 by means not shown and relative rotation therebetween is prevented by the rectangular mating surfaces. Each of the arms 64, 66 and 67 is generally rectangular in cross section. Further, each of the arms, and reference is made hereinafter only to the arm 66 since all arms are identical, has a rectangularly shaped channel formed longitudinally therein, and an elongated T-slot 68 is thus formed in the vertical side surface of the arm which engages the flat of the arm support 62. A guide member 69 is disposed in the slot 68 and generally fills across the slot so as to provide a sliding guide which has very little play therein. The guide 69 has a necked down portion which passes out of the slot 68 and which supports a downwardly extending guide having a configuration similar to the guide 69 but being disposed perpendicular thereto. The downward guide is disposed within a central aperture 73 of an arm 74 having a narrow slot 76 formed lengthwise in the surface thereof which abuts the surface of the arm 66 having the slot 68 formed therein.

As a result of this construction the arm 74 is slidable in direction along the length of the arm 66 and is movable perpendicularly with respect to the arm 66 along the downward guide. A thumb screw 77 is employed for locking the guide 69 in the arm 66 so as to prevent undesired inward or outward movement of the arm 74 relative to the arm 66 and at the same time acts by lever action to clamp arm 74 between the downward guide and arm 66 to prevent undesired upward or downward movement of the arm 74 relative to the arm 66. The lower end of the arm 74 is formed into a point 79 in alignment with the surface of the arm closest to the sleeve 31. Actually it is unimportant which of the surfaces of the arm 74 have the points formed thereon provided the respective indicating scales are appropriately arranged to indicate the radial displacement of the associated point relative to the axis of the shaft 30 and the illustrated arrangement is exemplary only.

The upper surface of the arm 66 has a scale 81 formed thereon and this scale is read along the surface of the arm 74 on which the point 79 is formed. The arm 74 is provided with a scale 82 which is read along the bottom surface of the arm 66 and indicates the distance of the point 79 down from the arm 66.

The arm support 62 is adapted to be moved axially downward or upward as necessary to a position such that the points 79 on the arms 74 may engage a plate 83, the angular position of which relative to the horizontal is intended to indicate the dip of the strata under investigation. The plate 83 is a circular disc with two diametrically opposed segments removed. The plate 83 is supported at the centers of the surfaces defining the chords of the removed segments by means of supports 86 and 87 and ball bearings 84 in upstanding arms 89 and 92, respectively. The support 86 is secured to arm 89 by a threaded pivot pin 88 which extends through an aperture in upstanding arm 89 and is screwed into support 86 essentially in the upper surface plane of plate 83 as discused below. The support 87 is provided with a pivot pin 91 extending through an aperture in an upstanding arm 92. Arms 89 and 92 are secured to the member 3 for rotation therewith and arm 92 is in a position diametrically opposed to the arm 89. The two arms 89 and 92 are disposed at 90° angles with respect to the pointer 22 on member 3.

The pivot pins 88 and 91 are horizontally aligned so that the plate 83 is permitted to pivot about a horizontal axis lying in the plane of the upper surface of plate 83. The pivot pin 91 has secured thereto, on its end remote from the support 87, a circular dial 93 which is adapted to rotate with the pin 91 and hence the plate 83. The dial 93 carries a scale 94 which is read adjacent an arrow or other suitable indicator 96 formed on a portion 92' of the arm 92 extending above the disc 93. Thus, the angle of rotation of the plate 83 relative to the horizontal may be read on the scale 94 opposite the indicator 96. Scale 94 is calibrated in but one direction from zero in order that the downward slope of plate 83 is always measured rather than its upward slope. A dial 97 similar in all respects to dial 93 is secured to pivot pin 88 for readings disposed 90° relative to dial 93.

As previously indicated, specific information must be available to apply to the various members of the instrument and specifically this information must include the angle of the log instrument from the vertical, the azimuth of the logging instrument with reference to a particular reference, i.e. No. 1 logging arm, and the azimuth of the inclination of the well bore. In addition, there must be provided a measurement of each of the three electrode arms of the instrument from the center of the well and the depth, below some arbitrary reference datum, of the variations in width of the well and resistances which are interpreted as indicating a particular stratum change. An additional setting for the instrument is the area compass correction which is to be set into the member 3 by scale 21 and pointer 22 .

In operation, with retaining screws 16 loosened, the area compass correction is set on scale 21 at pointer 22. The angle of well direction deviation is set on scale 17 at an angle with respect to north by loosening screws 15 and moving the point on scale 17 representing north relative to pointer 18 on base member 1. The screws 15 and 16 are tightened after the movement of the respective plates 12 and 14.

The thumb screw 50 may now be loosened and the carriage 33 moved to the right of the center along track 40, as illustrated in FIGURE 2, by an amount equal to the deviation of the well from vertical, i.e. the well inclination, which is indicated by the scale 51 relative to indicator 52. The thumb screw 50 may thereafter be tightened to lock the carriage 33 in position relative to the track 40. The position of the shaft 30 is now the same as the position of the well in space.

The next adjustment of the mechanism is to extend the arms 74 outwardly along the arms 64, 66 and 67 until they are at the corresponding distance from the center of the apparatus as the electrode arms were from the center of the apparatus as each detected a change in dimension of the well which is believed to be associated with a common stratum change. The heights of the arms 74 are now adjusted to correspond to the positions in the well at which the various changes in resistance associated with the change of one stratum to another were detected by each of the electrode arms. Next, the thumb screw 60 is loosened so that the plate 34 may be rotated relative to the track 40 and a reading is set relative to the indicator 37 equal to the angular position of the logging instrument with respect to the well such that the arm 66 correspond in space with the position of the No. 1 well tool electrode, after which the thumb screw 60 is tightened. The rotatable cylindrical member 3 is then rotated and at the same time the arm support 62 is lowered by loosening screw 38 until the points 79 of all of the arms 74 engage the plate 83. Since three points in space define a plane, the positioning of the plate 83 so that it contacts all three of the points 79 of the arms 74 insures that the plate 83 lies in the same position relative to the shaft 30 as the stratum under investigation bore does with respect to the well. The dip of the stratum may now be read directly from the scale 94 on the dial 93 or scale 97 on dial 98, and the true orientation may be read from scale 19 at pointer 20 on plate 12.

The apparatus of the present invention is thus particularly useful in that all elements which have a physical analog in the well have the same positions relative to one another as the elements in the well. Therefore, the instrument can provide a complete and exact visual analog of conditions as they existed at the time of measurement. An additional important feature of the apparatus of the present invention is that all readings may be set in at any time relative to one another and no specific order of insertion of readings must be followed. Thus, it is unimportant to the final reading whether the arms 74 are adjusted first or last or the element 35 or disc 34 are adjusted first relative to one another or to any other setting. Thus, the instrument is completely flexible and if one reading is forgotten or in error during the initial setup of the apparatus all readings are not thrown off and only a single adjustment need be made to effect correction.

Additionally, although the invention has been described as used in conjunction with information derived from measurements made with a well logging tool having three electrode arms, the computer of this invention finds equal application when the measurements are made with a dip logging instrument in which a stratum is identified at each of three or more angularly spaced arms and by any other change in characteristic as by a change in abrasive resistivity determined by the variation in diameter of the well in accordance with the nature of the rock in the region.

It is claimed:

1. A measuring instrument for determining and producing a visual representation of the true dip and direction of dip of a subsurface stratum encountered by a borehole from information derived from a logging tool having at least three measuring devices angularly spaced about the axis of said tool, which information includes the depth at which each of said devices encountered said stratum, the displacement of said devices from the axis of said tool, the deviation of the tool axis from vertical, the direction of said deviation with respect to a reference direction, and the angular position of said tool with respect to a reference direction, said instrument comprising a mounting frame having a base and a parti-circular track mounted on said base; read-in apparatus comprising a carriage adjustably mounted on said track for displacement from a zero position corresponding to the deviation of said tool axis from vertical, a shaft rotatably mounted on said carriage and having a free end dependent therefrom in a vertical plane adapted for angular displacement relative to said vertical plane corresponding to said angular position of said tool, means mounted on said free end of said shaft for movement therewith to the said angular position of said tool with respect to a reference direction including a pointer for each said measuring device, each said pointer being independently movable laterally and longitudinally for displacement with respect to said shaft to a position corresponding to the lateral and longitudinal position of a respective one of said devices where it encountered said stratum; and read-out apparatus comprising a flat plate mounted on said base beneath said free end of the shaft for rotation about a vertical axis in said vertical plane and about a horizontal axis parallel to the flat upper surface of said plate for displacement into the plane of said pointers to cause said pointers all to rest against said plate, means for indicating the angle between the plane of said upper surface of said plate and the horizontal as an indication of the true dip of the stratum, and means for indicating the direction of the downward slope of said plate comprising two circular rings, one of said rings including means for reading-in said direction of the well deviation with respect to a reference direction and the other of said rings including means for reading-out the direction of the downward slope of said flat plate with respect to the reference direction against an additional reference on said one of said rings.

2. The instrument of claim 1 wherein said base includes a circular recess the axis of which coincides with said vertical axis, said means for rotatably mounting said flat plate comprising a circular member mounted in said recess for rotation about said vertical axis, said two circular rings being arranged in said recess in the area between said circular member and the outer wall of said recess for rotation about said vertical axis, the outer one of said circular rings including said means for reading-in said direction of the well deviation with respect to a reference direction, the inner of said circular rings including said means for reading-out the direction of downward slope of said plate with respect to the reference direction against a reference point on said outer ring.

3. The instrument of claim 2 wherein the upper surfaces of said member and said two circular rings are in the same plane.

4. An instrument for producing a true visual representation of the true dip and true direction of dip of subsurface strata from information obtained by a logging tool having a plurality of measuring devices angularly spaced about the axis of said tool, which information consists of the depth at which each of said devices encountered said stratum, the displacement of said devices from the axis of said tool, the deviation of the tool axis from vertical, the direction of said deviation with respect to a reference direction, and the angular position of said tool with respect to compass direction, said instrument consisting essentially of a mounting frame including a base having circular opening therein and a circular recess coaxial with said opening, and a semi-circular track mounted on said base; read-in apparatus comprising a carriage slidably supported on said track for displacement from a zero position to an angle of up to approximately 90° corresponding to the deviation of said tool axis from vertical, means for releasably securing said carriage to said track, spider means arranged below said carriage and having a free end supporting a pointer for each said measuring device, means for supporting said spider means adapted for the quick removal and replacement thereof comprising a shaft rotatably mounted on said carriage and having a free end dependent therefrom in a vertical plane containing the axis of said opening for angular displacement relative to said vertical plane corresponding to the angular position of said tool, means for releasably securing said shaft against rotation, said shaft being longitudinally adjustable with respect to said carriage, and plate means adapted to rotate with said shaft having a graduated scale thereon representing said last-mentioned angular position and adjustable with respect to a reference point in the vertical plane of said semi-circular track, said spider means being secured to said free end of said shaft below said carriage, said pointers being essentially parallel to said shaft, each said pointer being movable independently laterally and longitudinally with respect to said spider means and said shaft end, means for releasably securing each said pointer in the position corresponding to the lateral and longitudinal position of a respective one of said devices where it encountered said stratum; read-out apparatus independent of said read-in apparatus comprising a member including a center portion supported in said circular opening for rotation about the axis thereof and a flange portion extending outwardly from said center portion to a point near the wall of said recess formed by said base, two separate circular rings supported adjacent each other in the area between said flange portion and said wall and adapted for rotation about the axis of said opening, the upper surfaces of said base, said two rings and said member being in the same plane, the outer one of said rings with respect to said axis having read-in means for said direction marked on said base of the deviation from vertical with respect to a reference direction marked on said base including means for releasably securing said outer ring to said base, a flat plate supported by said member beneath the free end of said shaft and said pointers for rotation about said vertical axis and for rotation about a horizontal axis parallel to the plane of the upper surface of said flat plate, and means for indicating the angle between the plane of the upper surface of said flat plate and the horizontal as an indication of the angle of the dip of said stratum, the inner one of said circular rings having read-out means indicating the direction of the downward slope of said flat plate with respect to a reference direction as an indication of the true direction of the dip of said stratum including means for releasably securing said inner circular plate to said circular member.

5. The instrument of claim 4 wherein the read-in means for said outer ring comprise indicia graduated in degrees on the outer circumference thereof and adjustable with respect to a reference point on said base in the vertical plane of said semi-circular track, said read-out means for the inner ring comprising indicia graduated in degrees on the outer circumference thereof and a reference indicia on the inner circumference of said outer ring, the inner circumference of said inner ring being graduated in degrees and adjustable with respect to a reference point on said member to the magnetic declination at the geographic location of said well.

6. In an instrument for determining and producing a true visual representation of the true dip and direction of dip of a subsurface stratum encountered by a borehole from indicia relating displacement of at least three uniformly spaced measuring devices of a well logging tool in contact with the walls of the borehole with respect to the center thereof, the orientation of one of said devices with respect to the compass, the deviation of the tool axis from vertical, and the direction of said deviation with respect to a reference direction, comprising a mounting frame having a base and a semi-circular track mounted in a vertical plane on said base; read-in apparatus comprising a carriage adjustably mounted on said track for displacement from a zero position corresponding to the deviation of said tool axis from vertical, means including a pointer for each said device supported below said carriage rotatable with respect to said vertical plane for angular displacement corresponding to the orientation of said one device with respect to compass direction, each said pointer being independently movable laterally and longitudinally for displacement with respect to a reference datum corresponding to the lateral and longitudinal position of a respective one of said devices where it encountered said stratum; the improvement of a single shaft rotatably mounted on said carriage and having a free end dependent therefrom in said vertical plane for supporting said last-mentioned means including said pointers, a circular member mounted on said base for rotation about a vertical axis arranged in said vertical plane, read-out apparatus comprising a flat plate mounted on said circular member and beneath said pointers and said free end of the shaft for rotation about a horizontal axis parallel to the flat upper surface thereof for displacement into the plane of said pointers when said member is moved to cause said pointers all to rest against said flat plate, means for indicating the angle between the plane of said upper surface of the plate and the horizontal as an indication of the true dip of the stratum, and means for indicating the direction of downward slope of said plate with respect to said reference direction as an indication of the true direction of the dip of the stratum, said last-mentioned means comprising two circular rings adjacent said member mounted for rotation about said vertical axis, the outer one of said rings being graduated about its outer circumferences in degrees and adjustable with respect to a reference point on said base and in said vertical plane for reading-in the direction of the well deviation from the vertical with respect to the reference direction as represented by said reference point, the inner one of said rings being graduated about its inner circumferences in degrees and adjustable with respect to a reference point on said circular member to the magnetic declination at the geographic location of said well, the outer circumference of said inner ring being graduated in degrees and adjustable with respect to a reference point on said outer ring for reading-out the direction of the downward slope of said flat plate with respect to the reference direction.

7. The instrument as defined in claim 6, further including means for releasably securing said outer ring to said base and means for releasably securing said inner ring to said circular member.

8. An instrument as defined in claim 6, wherein said means for indicating the angle between the plane of the upper surface of said plate and the horizontal comprises two circular plates each graduated about one quarter of its circumference in degrees, said circular plates being arranged respectively on opposite sides of said flat plate with the graduations extending in opposite directions, each said plate being secured to said flat plate for rotation therewith about said horizontal axis with the axis of the circumferential graduations on each said circular plate coinciding with said horizontal axis, whereby the angle between the upper surface of said flat plate and horizontal may be quickly read regardless of the direction of said downward slope.

9. The instrument of claim 6 wherein said means including a pointer for each said device has four pointers arranged in a single plane at 90° angles with respect to each other.

10. An instrument as defined in claim 6 wherein said base includes an opening the axis of which coincides with said vertical axis and a recess extending outwardly from said opening, said circular member including a center portion rotatably supported in said opening and a flange portion extending outwardly from said center portion to a point near the wall of said recess formed on said base, said two circular rings being supported adjacent each other in the area between said flange portion and said wall and adapted for rotation about the axis of said opening, the upper surfaces of said base, said two rings and said circular member being in the same plane.

11. An instrument as defined in claim 8 wherein said wall of the recess and the rim of said disc portion facing said wall each have a flange for supporting, respectively, said outer and said inner rings, said means for releasably securing the inner ring to said member and the other ring to said base each comprising screw means for binding the respective ring to the respective flange supporting the same, the head of each said screw means below the respective flange having a flat side adjacent a wall of the recess to prevent rotation of said screw means.

References Cited by the Examiner
UNITED STATES PATENTS 3,012,324  12/1961  Swift _____ 33—1

LEONARD FORMAN, Primary Examiner.

WILLIAM D. MARTIN, Jr., Assistant Examiner.

UNITED STATES PATENT OFFICE
CERTIFICATE OF CORRECTION

Patent No. 3,305,929                      February 28, 1967

Lauren G. Kilmer

It is hereby certified that error appears in the above numbered patent requiring correction and that the said Letters Patent should read as corrected below.

Column 11, line 5, for the claim reference numeral "8" read -- 10 --.

Signed and sealed this 27th day of August 1968.

(SEAL)
Attest:

Edward M. Fletcher, Jr.                          EDWARD J. BRENNER
Attesting Officer                                     Commissioner of Patents